(12) United States Patent
Snyder (10) Patent No.: US 12,168,556 B1
(45) Date of Patent: Dec. 17, 2024

(54) COMPARTMENTALIZED CONTAINER FOR MIXING VESSEL

(71) Applicant: Droptop LLC, South Bend, IN (US)

(72) Inventor: Daniel Clinton Snyder, South Bend, IN (US)

(73) Assignee: Droptop LLC, South Bend, IN (US)

( * ) Notice: Subject to any disclaimer, the term of this patent is extended or adjusted under 35 U.S.C. 154(b) by 0 days.

(21) Appl. No.: 18/743,535

(22) Filed: Jun. 14, 2024

Related U.S. Application Data

(60) Provisional application No. 63/508,747, filed on Jun. 16, 2023.

(51) Int. Cl.
| | | |
|---|---|---|
| *B65D 37/00* | (2006.01) |
| *A47J 43/27* | (2006.01) |
| *B01F 23/50* | (2022.01) |
| *B01F 33/501* | (2022.01) |
| *B65D 47/08* | (2006.01) |
| *B65D 51/28* | (2006.01) |
| *B01F 101/14* | (2022.01) |

(52) U.S. Cl.
CPC .......... *B65D 51/2892* (2013.01); *A47J 43/27* (2013.01); *B01F 23/50* (2022.01); *B01F 33/50111* (2022.01); *B65D 47/0871* (2013.01); *B01F 2101/14* (2022.01)

(58) Field of Classification Search
CPC .. B65D 51/2892; B65D 47/0871; A47J 43/27; B01F 23/50; B01F 33/50111; B01F 2101/14
See application file for complete search history.

(56) References Cited

U.S. PATENT DOCUMENTS

| | | | | |
|---|---|---|---|---|
| 6,921,087 B2 * | 7/2005 | Takahashi | .......... | B65D 51/2878 |
| | | | | 206/219 |
| 8,613,372 B2 * | 12/2013 | Porter | ................ | B65D 51/2821 |
| | | | | 220/521 |
| 9,629,782 B2 | 4/2017 | Hayes | | |
| 10,051,943 B2 * | 8/2018 | Choi | ..................... | A45D 40/265 |
| 2004/0118709 A1 * | 6/2004 | Cho | ................... | B65D 51/2892 |
| | | | | 206/219 |
| 2006/0186139 A1 * | 8/2006 | Laidler | ............... | B05B 11/1032 |
| | | | | 222/207 |
| 2013/0008808 A1 * | 1/2013 | Lee | ...................... | B65D 47/243 |
| | | | | 215/227 |
| 2015/0203261 A1 * | 7/2015 | Lee | ........................ | B65D 53/02 |
| | | | | 206/219 |
| 2021/0085566 A1 | 3/2021 | Keenan | | |

FOREIGN PATENT DOCUMENTS

| | | | | | |
|---|---|---|---|---|---|
| CN | 107531472 B | * | 10/2020 | .......... | B65D 45/025 |
| KR | 20100050065 A | * | 5/2010 | | |

* cited by examiner

*Primary Examiner* — Bob Zadeh
(74) *Attorney, Agent, or Firm* — Sanders Pianowski LLP (57) ABSTRACT

A drinking container has a lid that attaches to a vessel. The lid has a sidewall that forms a chamber with an opening. A spring-loaded door is pivotable between a closed position that seals the chamber opening from the vessel and an open position that allows transfer of fluid or solids between the chamber and the vessel. A lever has a catch that engages and holds the door in the closed position unless the lever is actuated by the user. The lever can be actuated by the user through an area on the lid that allows operation of the lever from the exterior of the container. The drinking container may include additional chambers with corresponding spring-loaded doors that are released through an area on the lid.

20 Claims, 10 Drawing Sheets

COMPARTMENTALIZED CONTAINER FOR MIXING VESSEL

CROSS REFERENCE TO RELATED APPLICATIONS

This application claims the benefit of Provisional Application Ser. No. 63/508,747, filed Jun. 16, 2023, the disclosure of which is incorporated by reference.

BACKGROUND OF THE INVENTION

Mixing powdered beverages in a container is a useful way to prepare supplements and other powdered beverages; many containers have been provided that do this. Typically, powder is mixed in a liquid, such as water or milk, by placing the powder into the container and then screwing on the lid to the container. Once the ingredients are all within the container, the mixture may be shaken to fully mix the powder and the liquid.

Mixing containers presently available for mixing powdered beverages generally do not have a good way to keep the powder separately contained within the container. This is useful so powder and liquid do not have to be separately added to the container in which they will be mixed. Those separate ingredients may come in their own separate containers. Ideally, having the ability to preload a chamber within the mixing container, then pouring the liquid into the container would provide a faster and easier method of carrying a powdered beverage. The capability to have a fluid tight container with the ability to fully mix and control when the powder is dispensed within the container is useful. Further usefulness is the ability to have multiple chambers within the fluid-tight confines of the mixing container so that multiple powders can be dispensed into the liquid held within the container just prior to mixing through shaking the container.

SUMMARY OF THE INVENTION

The present invention is a lid that is for attaching to a mixing vessel for mixing powdered beverages. The lid has an end wall with a hole therethrough and a sidewall extending from the end wall to define a chamber with an opening defined by a terminal edge of the sidewall. A door is pivotally fixed with respect to the sidewall and movable between an open position being spaced from the terminal edge of the sidewall and a closed position wherein the door contacts the terminal edge of the sidewall to close the chamber. The door pivots about a hinge.

A lever is pivotally fixed with respect to the sidewall and movable between a locked position and an open position. The lever has a catch portion that is for engaging the door and an actuating portion that is opposite the catch portion. The lever is pivotable about a hinge located between the catch portion and the actuating portion. The lever is biased toward the locked position. The lever restrains the door in the closed position and when the catch is engaged with the door.

DETAILED DESCRIPTION OF INVENTION

Figure 1:
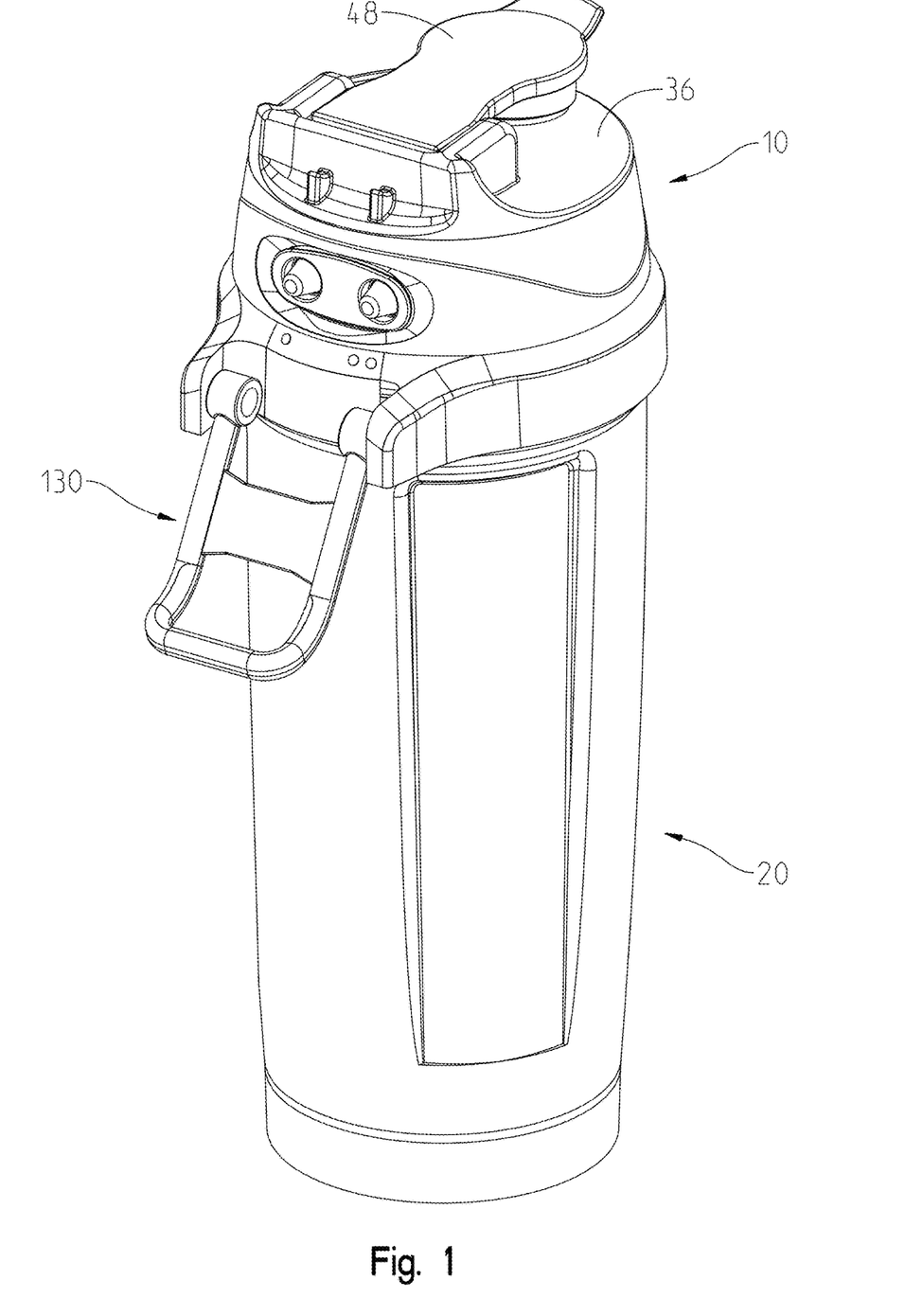
FIG. 1 is a perspective view of the lid and mixing vessel to which it is attached.
Figure 2:
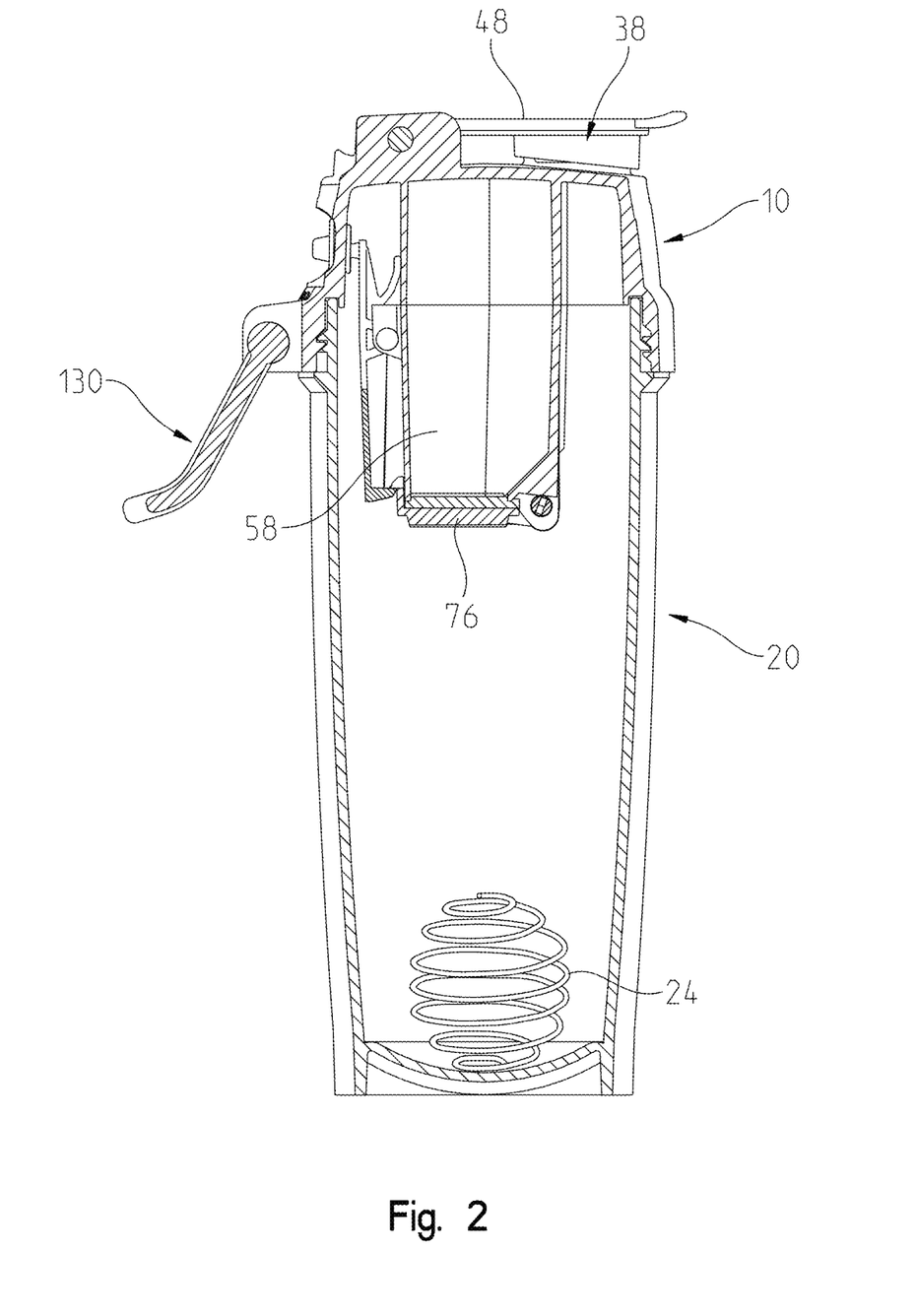
FIG. 2 is a partial sectional view of the lid and mixing vessel shown in FIG. 1.

The present invention is a lid 10 that is for being attached to a mixing vessel 20. The present invention is particularly useful for mixing powdered drink mixes with water or other fluids to be contained in the mixing vessel 20. Often, the powdered drink mix will be a protein shake or other supplement. FIG. 1 shows the lid 10 as it is attached to the mixing vessel 20. FIG. 2 is a partial sectional view of the lid 10 and mixing vessel 20 joined together. The mixing vessel 20 includes an agitator 24 for stirring the drink contained within the mixing vessel 20.

Figure 3:
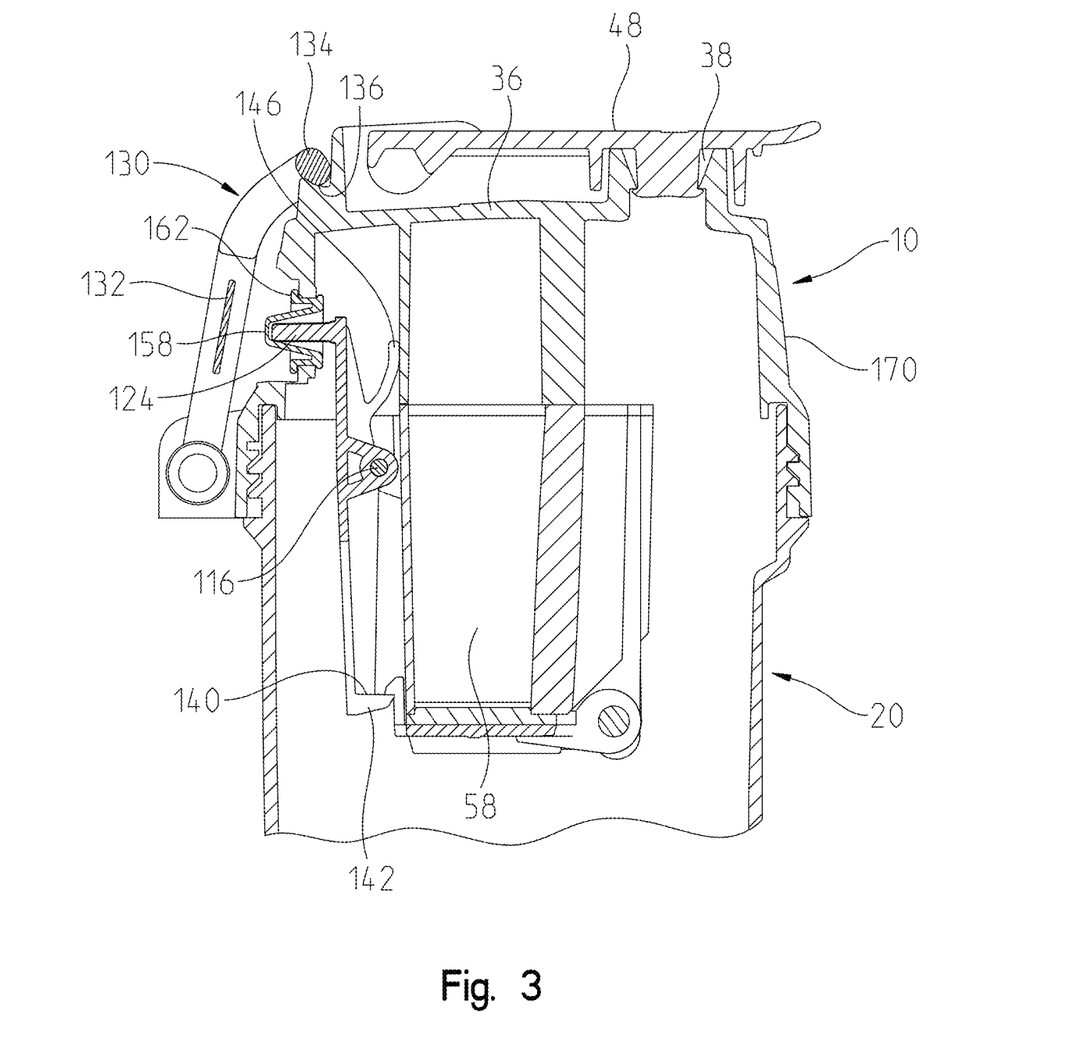
FIG. 3 is a sectional view of the lid and mixing vessel to which it is attached that is shown in FIGS. 1 and 2 showing the doors in their closed position.
Figure 6:
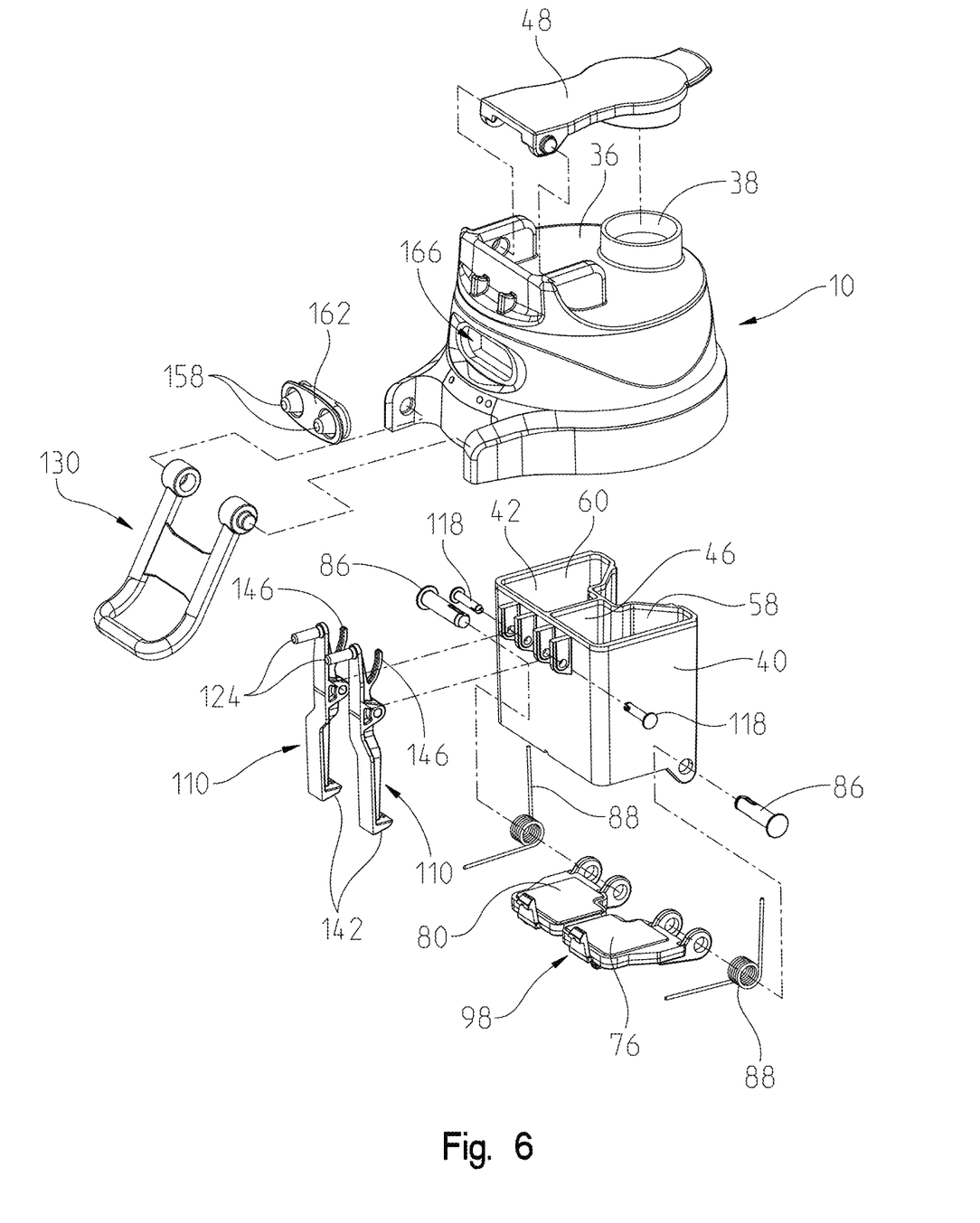
FIG. 6 is an exploded perspective view of the lid shown in FIGS. 1-5.
Figure 7:
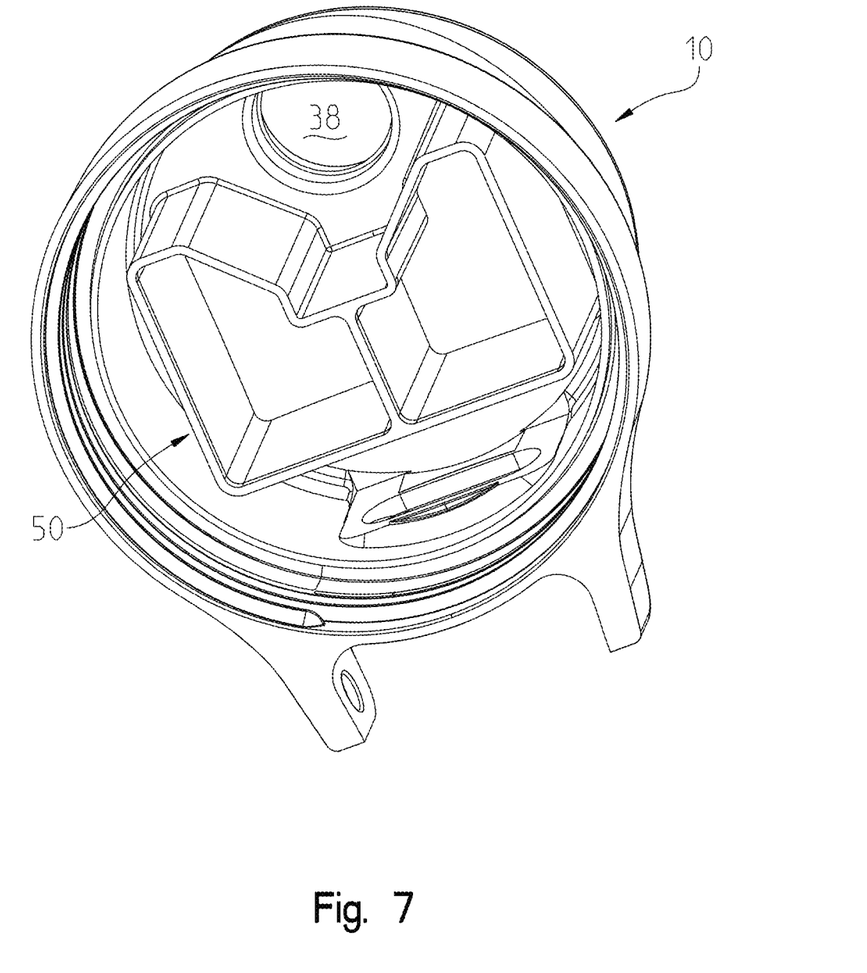
FIG. 7 is a perspective view of the lid shown in FIGS. 1-6 showing the underside of the lid.
Figure 8:
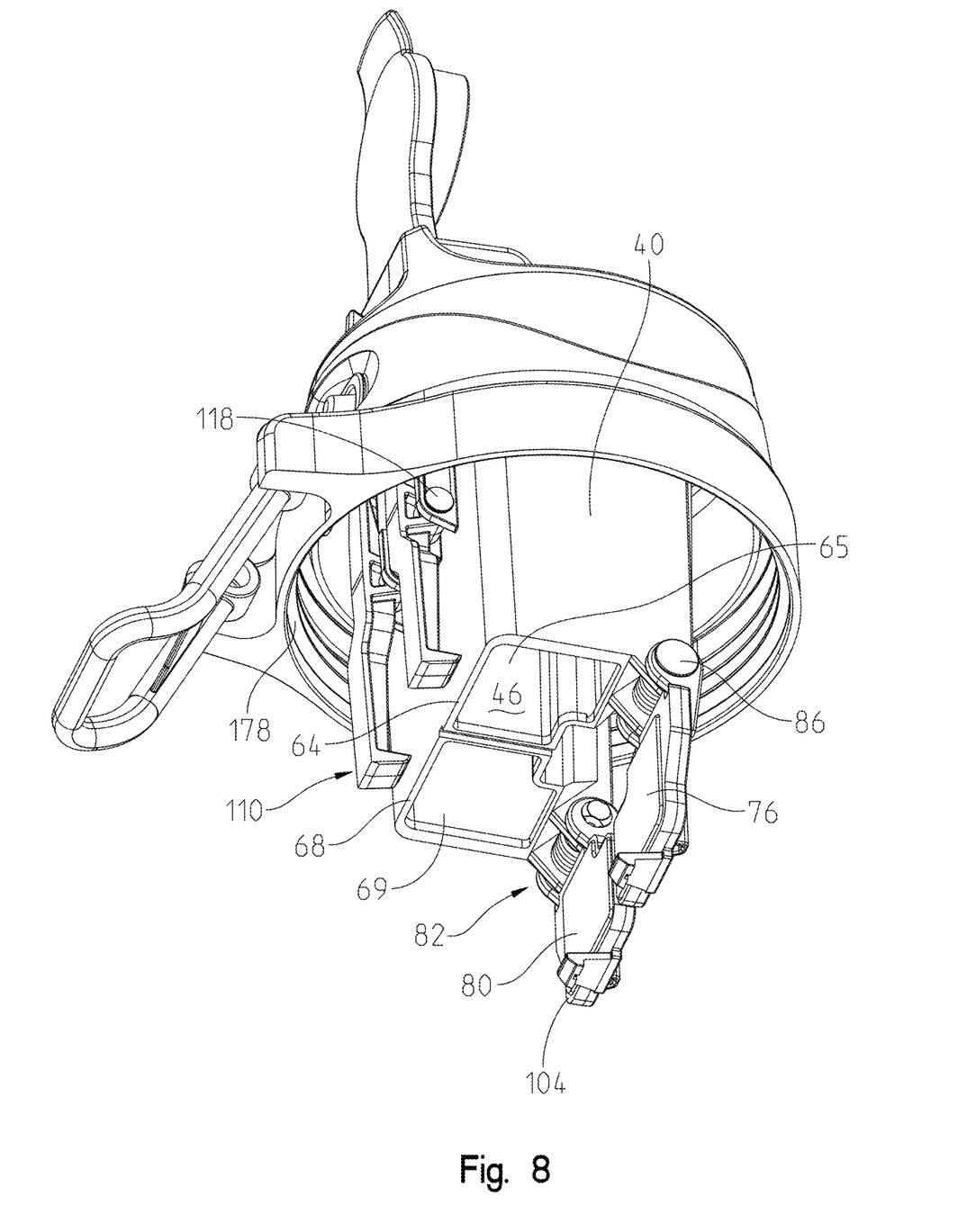
FIG. 8 is a perspective view of the lid shown in FIGS. 1-7 with the doors in their open position.
Figure 9:
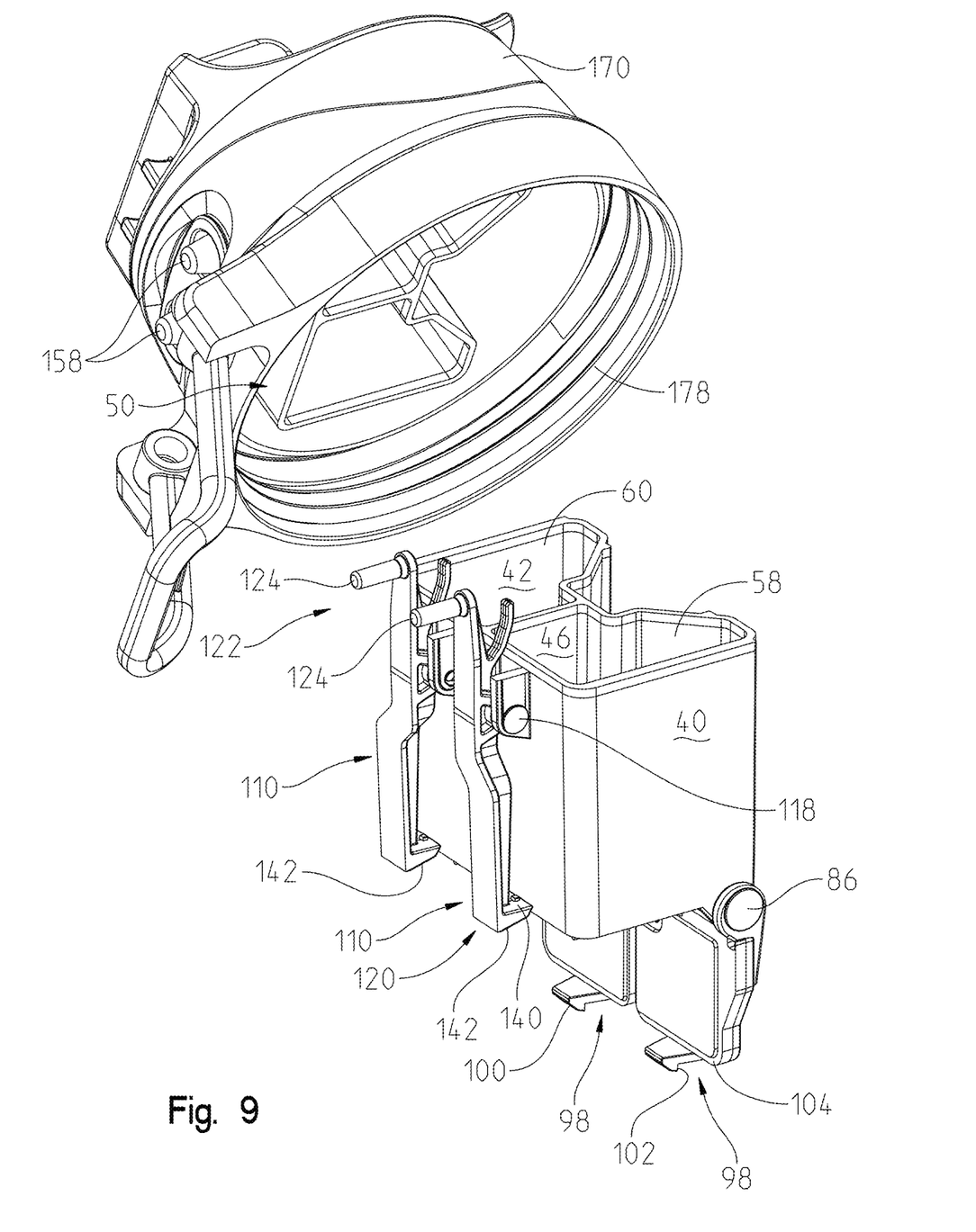
FIG. 9 is an exploded perspective view of the lid shown in FIGS. 3-8.
Figure 10:
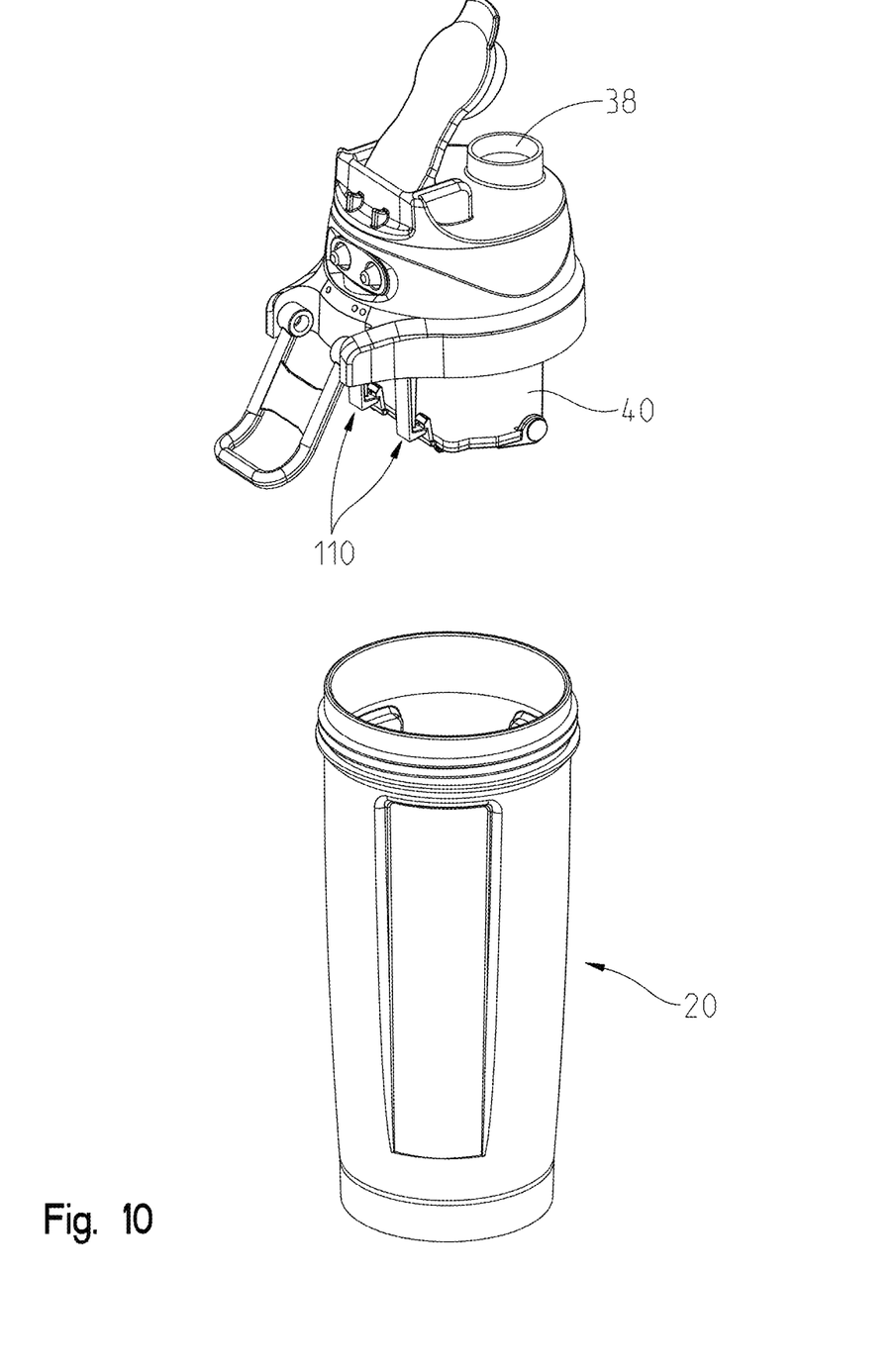
FIG. 10 is an exploded perspective view of the lid and mixing vessel shown in FIG. 1.

FIG. 3 is a magnified sectional view that shows parts of the lid 10. The lid 10 has an end wall 36 that defines the top of the lid 10. The lid 10 has a dispensing aperture 38 extending therethrough for dispensing the drink that is contained within the combination of the mixing vessel 20 and lid 10. The dispensing aperture 38 is sealed with a cap 48 that fits tightly onto the lid 10 to form a watertight seal. The cap 48 can pivot between a closed position and an open position. In the closed position, the cap 48 is sealed to the dispensing aperture 38. In the open position, the contents of the mixing vessel 20 can be dispensed. The end wall 36 has a first sidewall 40 and second sidewall 42 that join at a dividing wall 46, all of which extend outwardly from the end wall 36 of the lid 10. The first and second sidewalls 40, 42 may be bent into any configuration necessary to achieve a desired volume to be contained. FIGS. 6 and 7 show the sidewalls 40, 42 and the dividing wall 46. The sidewalls 40, 42 have a generally rectangular cross-section until they meet at the dividing wall 46. It is contemplated that the sidewalls 40, 42 could be semi-circular or other shapes as well. The first sidewall 40, second sidewall 42, and dividing wall 46 are formed from an upper section 50 and a lower section 54 that are shown exploded in FIG. 6 and joined together in FIGS. 3 and 4. The upper and lower sections 50, 54 are sealed permanently together to form chambers 58, 60. This is done for manufacturability, but may not always be necessary depending on the method of manufacture. The first sidewall 40 and dividing wall 46 form a first chamber 58 and the second sidewall 42 and dividing wall 46 form a second chamber 60. The first sidewall 40 and dividing wall 46 cooperate to form a first terminal edge 64 opposite the end wall 36. The first terminal edge 64 surrounds a first opening 65 in the first chamber 58. The second sidewall 42 and dividing wall 46 cooperate to form a second terminal edge 68 opposite the end wall 36. The second terminal edge 68 surrounds a second opening 69 in the second chamber 60.

The first chamber 58 has a first door 76 that pivots about a hinge 78, and the second chamber 60 has a second door 80 that pivots about a hinge 82. Each hinge 78, 82 has a pin 86 about which the corresponding door 76, 80 pivots. The doors 76, 80 have their corresponding hinges 78, 82 mounted to the corresponding sidewall 40, 42 adjacent to the particular opening 65, 69 that each door 76, 80 will cover. The doors 76, 80 may each pivot from an open position shown in FIG. 4, and a closed position shown in FIG. 3. The open position has the doors 76, 80 spaced from their corresponding terminal edge 64, 68, which leaves the chambers 58, 60 open. The closed position as shown in FIG. 3 has the doors 76, 80 contacting their corresponding terminal edges 64, 68, which closes the chambers 58, 60. It is contemplated that the hinges 78, 82 could also be a type of live hinge that is a continuous piece of material between each door 76, 80 and its corresponding sidewall 40, 42 that is flexible through a thinned area. It is further contemplated that the doors 76, 80 are each joined to its corresponding sidewall 40, 42 through a resilient material, either molded or assembled therebetween. As can be seen in FIG. 6, a torsion spring 88 is wrapped around each pin 86 so that the doors 76, 80 are biased toward their open position.

Each door 76, 80 includes a tab 98 that extends therefrom and is opposite the hinge 78, 82. Each tab 98 has an inclined surface 100 and a catch surface 102. The catch surface 102 is a flat surface that that is substantially parallel to the mating surface 104 of the door 76, 80 to which it is attached. Either the mating surface 104 of each door 76, 80 or the terminal edges 64, 68 may include a resilient gasket to facilitate sealing. The mating surface 104 of each door 76, 80 is for making a seal against the respective terminal edges 64, 68 so that the openings 65, 69 of each chamber 58, 60 remain sealed. In cases where a resilient seal is used to seal the doors 76, 80, the compressed resilient seal will bias each door 76, 80 toward its open position in addition to the force that the torsion spring 88 provides when the doors 76, 80 are in their closed positions. The resilient seal is not shown but may be of many different types of configurations.

Figure 4:
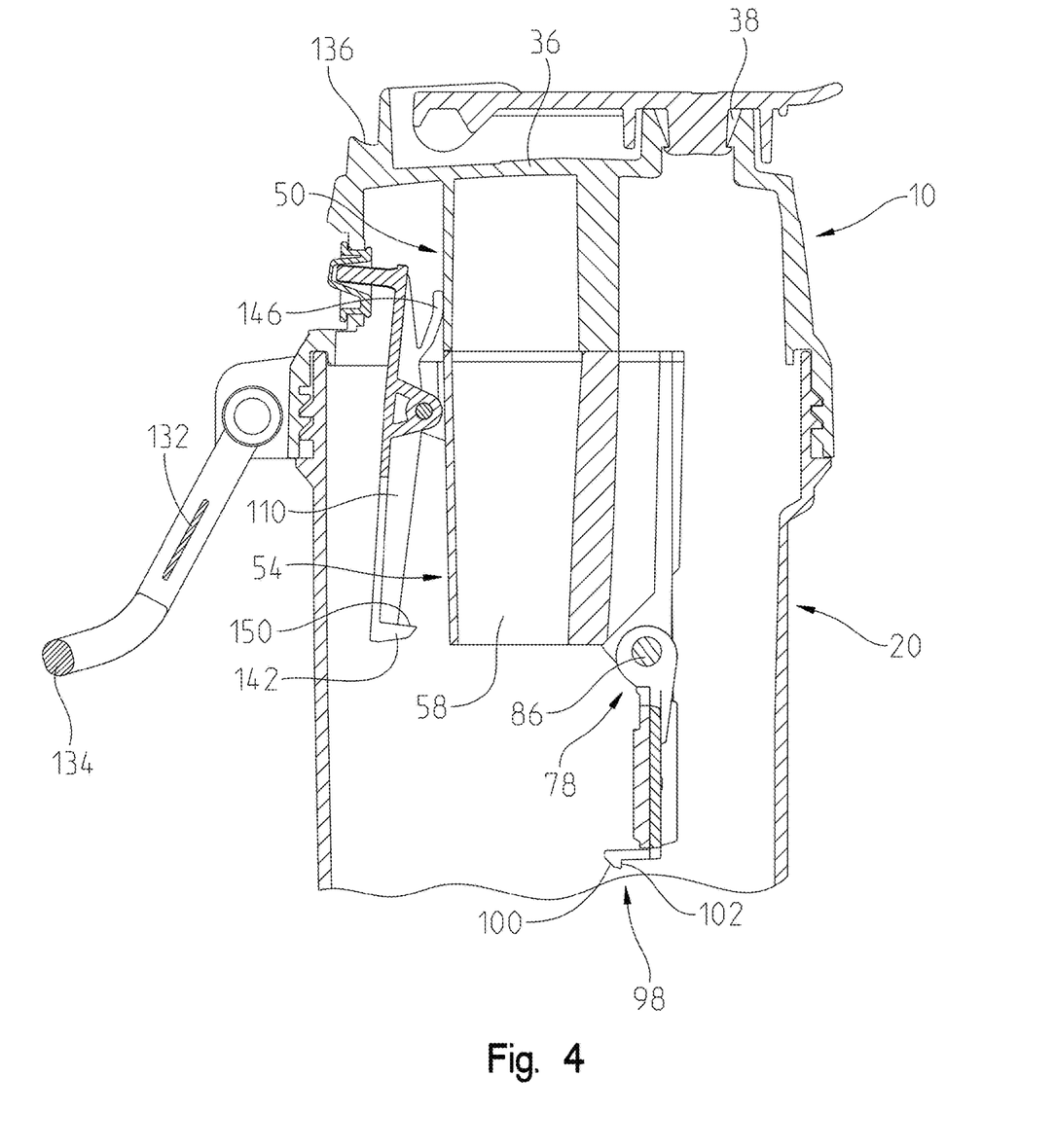
FIG. 4 is a sectional view of the lid and mixing vessel to which it is attached that is shown in FIGS. 1-3 showing the doors in their open position.
Figure 5:
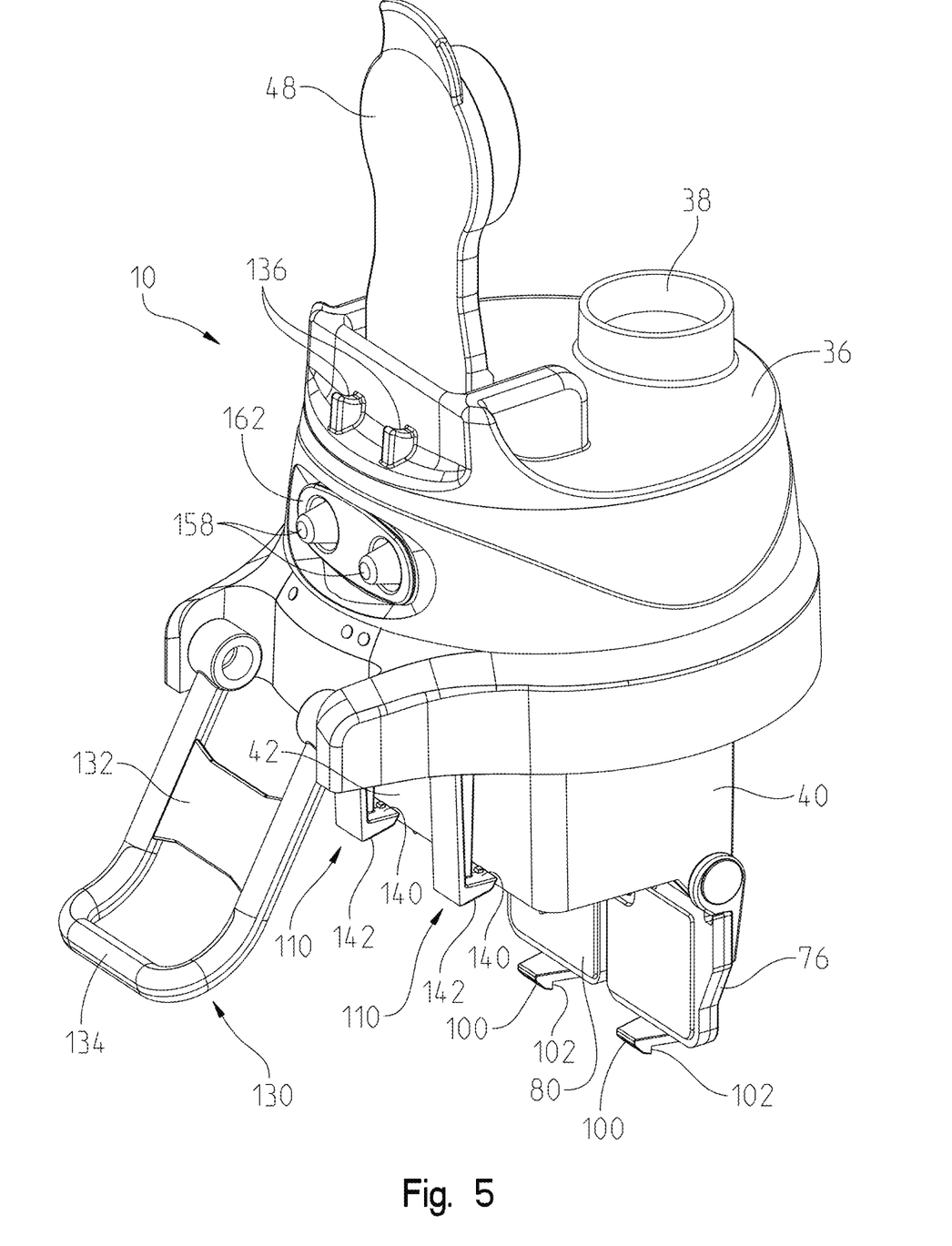
FIG. 5 is a perspective view of the lid shown in FIGS. 1-4 with the doors in their open position.

Each sidewall 40, 42 includes a lever 110 that is pivotally attached thereto. Each lever 110 pivots about a hinge 116 that includes a pin 118 about which the lever 110 may pivot. The levers 110 may pivot between a locked position and an open position. The locked position is shown in FIG. 3 and the open position is shown in FIG. 4. The levers 110 have a catch portion 120 that is for engaging the tab 98 on each door 76, 80 and an actuating portion 122. The actuating portion 122 includes a raised button 124. The catch portion 120 of the levers 110 has a catch surface 140 and an inclined surface 142 that is opposite to the catch surface 140. The hinge 116 is located between the catch portion 120 and the actuating portion 122. The levers 110 have a cantilever spring 146 that biases the levers 110 toward their locked position. As can be seen in FIG. 3, the locked position of the levers 110 corresponds to the levers 110 restraining the doors 76, 80, and, as shown in FIG. 4, the open position of the levers 110 corresponds to the levers 110 being spaced from the doors 76, 80 so that the catch portion 120 of the levers 110 is not in contact with the corresponding door 76, 80. The catch surfaces 140 of the levers 110 are flat and designed to align with the catch surface 102 of the tabs 98 on the doors 76, 80. When the inclined surfaces 100 on the tabs 98 on the doors 76, 80 contact the inclined surfaces 142 of the levers 110, the lever is pushed away from its corresponding door 76, 80 until the biased levers 110 are urged toward the doors 76, 80 when the catch surfaces 102, 150 move past each other. Because the catch surfaces 102, 150 are both flat and in biased contact, the doors 76, 80 are held against the terminal edges 64, 65 of each chamber 58, 60.

Pushing the button 124 on the actuating portion 122 of each lever 110 brings the actuating portion 122 nearer to its corresponding sidewall 40, 42 and at the same time moves the catch portion 120 away from the corresponding sidewall 40, 42. Pushing the button 124 flexes the cantilever spring 146 during the motion from the locked position of the lever 110 to the unlocked position of the lever 110. Once the levers 110 are moved into their unlocked position, as shown in FIG. 4, the springs open the doors 76, 80 to open the chambers 58, 60. The buttons 124 may also include a sealed button 158 that is held in place with a rubber sealing membrane 162 that is used to seal holes 166 in a perimeter wall 170 that surrounds the sidewalls 40, 42 forming the chambers 58, 60. The holes 166 provide access so a user may push the actuating portion 122 of each lever 110. It is contemplated that instead of a separate sealing membrane 162, the perimeter wall 170 has a flexible or thinned portion that allows the user to actuate the buttons 124.

The perimeter wall 170 provides a connection to the mixing vessel 20. The perimeter wall 170 has threads 178 that thread onto the mixing vessel 20. When the lid 10 is secured to the mixing vessel 20 the connection of these two parts forms a fluid tight connection. The lid 10 having its cap 48 covering dispensing aperture 38 prevents the escape of any fluid contained withing the mixing vessel 20 when the lid 10 is affixed to the mixing vessel 20. The rubber sealing membrane 162 ensures that no fluid leaks out adjacent to the holes 166 that provide access to the actuating portion 122 of the levers 110. As such, the lid 10 and mixing vessel 20 cooperate to form a watertight mixing container.

The lid 10 includes a pivotable dual-purpose carry handle and shield 130. The shield 130 includes a wall 132 that extends across between sides of the shield 130. The shield 130 can be retained in a shielded position, shown in FIG. 3, when the handle portion 134 is engaged with a snap feature 136. In the shielded position, the wall 132 obscures the sealed buttons 158 to prevent inadvertent release of the levers 110. As shown, the snap feature 136 uses a ramped and/or profiled surface to create an interference when the handle portion 134 engages the snap feature 136. Temporary distortion of the shield 130 and the profile of the snap feature 136 selectively retains the shield 130 in the shielded position until the user applies enough force to disengage the snap feature 136 and handle portion 134.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A lid comprising:
    an end wall having a dispensing aperture therethrough, said end wall having a sidewall extending therefrom to define a chamber having an opening defined by a terminal edge of said sidewall;
    a door pivotally fixed with respect to said sidewall and movable between an open position being spaced from said opening and a closed position wherein said door contacts said opening to close said chamber, said door being pivotable about a hinge and biased towards said open position;

a lever pivotally fixed with respect to said sidewall and movable between a locked position and an unlocked position, said lever having a catch portion for engaging said door and an actuating portion opposite said catch portion, said lever being pivotable about a hinge located between said catch portion and said actuating portion, said lever being biased toward said locked position; and said lever restraining said door in said locked position when said catch portion is engaged with said door.

2. The lid of claim 1, wherein said end wall includes a perimeter wall extending therefrom and surrounding said sidewall of said chamber, said perimeter wall including a hole therethrough for accessing said actuating portion of said lever.

3. The lid of claim 2, further comprising a flexible seal spanning said hole in said perimeter wall, said flexible seal providing flexible access to said actuating portion of said lever.

4. The lid of claim 2, wherein said perimeter wall includes a receiving portion for receiving a vessel attached to said lid, said receiving portion is threaded for threadably engaging said vessel.

5. The lid of claim 1, wherein said end wall includes a second sidewall extending from said end wall to define a second chamber having a second opening defined by a second terminal edge of said second sidewall, a second door being pivotally fixed with respect to said second sidewall and movable between an open position being spaced from said second opening and a closed position wherein said second door contacts said second opening to close said second chamber, said second door being pivotable about a second hinge, a second lever pivotally fixed with respect to said second sidewall and movable between a locked position and an unlocked position, said second lever having a catch portion for engaging said second door and an actuating portion opposite said catch portion, said second lever being pivotable about a hinge located between said catch portion and said actuating portion of said second lever, said second lever being biased toward said locked position; said second lever restraining said second door in said closed position when said catch portion of said second lever is engaged with said second door.

6. The lid of claim 1, wherein one of said lever or said door includes an inclined surface and when an other of said lever or said door contacts said inclined surface, said lever is moved toward said unlocked position and said lever moving into said locked position when said door is in said closed position.

7. The lid of claim 1, wherein said end wall includes a perimeter wall extending therefrom and surrounding said sidewall of said chamber, said lever is movable to said unlocked position through displacement of a portion of said perimeter wall.

8. The lid of claim 1, further comprising a pivotable shield, said pivotable shield is selectively retainable in a shielded position when a portion of said shield is engaged with a snap feature on said lid, said pivotable shield obscuring said actuating portion in said shielded position.

9. A container comprising:
a lid having an end wall with a dispensing aperture therethrough and a sidewall extending from said end wall to define a chamber having an opening defined by a terminal edge of said sidewall;
a door pivotally fixed with respect to said sidewall and movable between an open position being spaced from said opening and a closed position wherein said door contacts said opening to close said chamber, said door being pivotable about a hinge;
a lever pivotally fixed with respect to said sidewall and movable between a locked position and an unlocked position, said lever having a catch portion for engaging said door and an actuating portion opposite said catch portion, said lever being pivotable about a hinge located between said catch portion and said actuating portion, said lever being biased toward said locked position;
said lever restraining said door in said locked position when said catch portion is engaged with said door;
a vessel sealably attachable to said lid.

10. The container of claim 9, wherein said end wall includes a perimeter wall extending therefrom and surrounding said sidewall of said chamber, said perimeter wall including a hole therethrough for accessing said actuating portion of said lever.

11. The container of claim 10, further comprising a flexible seal spanning said hole in said perimeter wall, said flexible seal providing flexible access to said actuating portion of said lever.

12. The container of claim 10, wherein said perimeter wall includes a receiving portion for receiving said vessel, said receiving portion is threaded for threadably engaging said vessel.

13. The container of claim 9, wherein said door is biased towards said open position.

14. The container of claim 9, wherein said end wall includes a second sidewall extending from said end wall to define a second chamber having a second opening defined by a second terminal edge of said second sidewall, a second door being pivotally fixed with respect to said second sidewall and movable between an open position being spaced from said second opening and a closed position wherein said second door contacts said second opening to close said second chamber, said second door being pivotable about a second hinge, a second lever pivotally fixed with respect to said second sidewall and movable between a locked position and an unlocked position, said second lever having a catch portion for engaging said second door and an actuating portion opposite said catch portion, said second lever being pivotable about a hinge located between said catch portion and said actuating portion of said second lever, said second lever being biased toward said locked position, said second lever restraining said second door in said closed position when said catch portion of said second lever is engaged with said second door.

15. The container of claim 9, wherein one of said lever or said door includes an inclined surface and when an other of said lever or said door contacts said inclined surface, said lever is moved toward said unlocked position and said lever moving into said locked position when said door is in said closed position.

16. The container of claim 9, wherein said end wall includes a perimeter wall extending therefrom and surrounding said sidewall of said chamber, said lever is movable to said unlocked position through displacement of a portion of said perimeter wall.

17. The container of claim 9, further comprising a pivotable shield, said pivotable shield is selectively retainable in a shielded position when a portion of said shield is engaged with a snap feature on said lid, said pivotable shield obscuring said actuating portion in said shielded position.

18. A lid comprising:
- an end wall having a dispensing aperture therethrough, said end wall having a sidewall extending therefrom to define a chamber, said chamber having an opening;
- a door pivotally fixed with respect to said sidewall and movable between an open position being spaced from said opening and a closed position wherein said door seals said chamber, said door being pivotable about a hinge and biased towards said open position;
- a lever moveable between a locked position and an unlocked position, said lever having a catch portion for engaging said door and an actuating portion for moving said catch portion, said lever being biased toward said locked position;
- said lever restraining said door in said locked position when said catch portion is engaged with said door; and
- a pivotable shield is selectively retainable in a shielded position when a portion of said shield is engaged with a snap feature on said lid, said pivotable shield obscuring said actuating portion in said shielded position.

19. The lid of claim 18, wherein said end wall includes a perimeter wall extending therefrom and surrounding said sidewall of said chamber, said lever is movable to said unlocked position through displacement of a portion of said perimeter wall.

20. The lid of claim 18, wherein said end wall includes a second sidewall extending from said end wall to define a second chamber having a second opening, a second door being pivotally fixed with respect to said second sidewall and movable between an open position being spaced from said second opening and a closed position wherein said second door seals said second chamber, said second door being pivotable about a second hinge, a second lever pivotally fixed with respect to said second sidewall and movable between a locked position and an unlocked position, said second lever having a catch portion for engaging said second door and an actuating portion for moving said catch portion, said second lever being biased toward said locked position, said second lever restraining said second door in said closed position when said catch portion of said second lever is engaged with said second door.

* * * * *